United States Patent [19]
Shimei

[11] Patent Number: 5,022,284
[45] Date of Patent: Jun. 11, 1991

[54] AUTOMATIC TRANSMISSION CONTROL SYSTEM

[75] Inventor: Masato Shimei, Odaka, Japan

[73] Assignee: Aisin Seiki Kabushiki Kaisha, Kariya, Japan

[21] Appl. No.: 587,790

[22] Filed: Sep. 25, 1990

[30] Foreign Application Priority Data

Sep. 30, 1989 [JP] Japan .................. 01-253749

[51] Int. Cl.$^5$ .............................................. B60K 41/18
[52] U.S. Cl. ........................................ 74/844; 74/867
[58] Field of Search ................................. 74/844, 867

[56] References Cited

U.S. PATENT DOCUMENTS

| | | | |
|---|---|---|---|
| 4,637,281 | 1/1987 | Van Selous | 74/867 X |
| 4,779,489 | 10/1988 | Haley | 74/844 |
| 4,854,195 | 8/1989 | Morato et al. | 74/867 |
| 4,856,381 | 8/1989 | Funahashi et al. | 74/867 |
| 4,930,376 | 6/1990 | Van Selous | 74/867 |

Primary Examiner—Dirk Wright
Attorney, Agent, or Firm—Burns, Doane, Swecker & Mathis

[57] ABSTRACT

An automatic transmission shift control device has a plurality of multiple element friction engaging devices. Also provided is a shift timing valve having a return spring and port, a throttle valve operator, an oil temperature sensor and a controller for operation the throttle valve operator so that the accumulator back pressure modulated by the throttle pressure is less than that provided when the oil temperature is under a predetermined value as compared to when the oil temperature sensed by the oil temperature sensor is greater than the predetermined value.

3 Claims, 8 Drawing Sheets

AUTOMATIC TRANSMISSION CONTROL SYSTEM

BACKGROUND OF THE INVENTION

1. Field of the Invention

The invention relates to an automatic transmission control device in which gears of the transmission are shifted or changed by a plurality of friction engaging elements.

2. Description of the Related Art

Shift control systems of an automatic transmission are operated, on the one hand, by a combination of one-way clutches, multiple friction engaging elements (clutches, brakes) and band brakes and, the other hand, by a combination of multiple friction engaging elements (clutches, brakes). The shift control system includes a timing control for timing the intake and exhaust of the hydraulic operating oil supply from an operating means of a friction engaging element. The timing control can operate to exhaust the hydraulic operating oil when the oil pressure on the intake side of the operator of the friction element reaches a predetermined pressure value. This type of a timing control is operated by, for example, a shift timing valve shown in a manual for the Toyota Landcruiser New Automobile, lines 10–36, and FIG. 6 (published in 1984). The timing valve therein is a 2→3 shift timing valve which controls timing for draining the oil pressure of the brake B1 when the system is shifted from the 2nd gear to the 3rd gear so as to disengage the brake B1 and engage the clutch C3. The timing valve reduces the shift-shock which occurs during the shift between gear ratios. In the 2→3 shift timing valve, a spool 1 is urged to the upper position by the spring 2 while the vehicle is operated in the second gear. When changing to the third gear, the engaging oil pressure $P_{c2}$ of the rear clutch $C_2$ is transmitted through an orifice (not shown) from the 2→3 shift valve via passage $L_1$. The spool 1 is then urged to the lower position against the oil pressure $P_{ACC}$ transmitted from the accumulator control valve through the passage $L_2$ and against the force of the spring 2. When the spool 1 is moving to the lower position and the oil pressure $PC_2$ does not increase sufficiently, the oil pressure $P_{B1}$ of the brake B1 transmitted through the passage $L_3$ only passes through the passage $L_4$ and the orifice 3. Therefore, the engagement of the second brake B1 is maintained. When the engaging oil pressure $PC_2$ of the clutch $C_2$ increases further and the spool 1 moves further to a lower position, the passage $L_5$ provided below the orifice 3 is opened and the oil pressure $P_{B1}$ is quickly reduced and the engagement of the brake B1 is released. At this time, the oil pressure of the rear clutch $C_2$ is changed to a pressure, the range of which overlaps slightly with the pressure range of the second brake B1, and the rear clutch $C_2$ is engaged. Thereby, the shifting to the third gear ratio is completed.

FIG. 8 shows a characteristic of the $C_2$ clutch oil pressure $Pc_2$ and the $B_1$ brake oil pressure $P_{B1}$ at the 2→3 shift by the 2→3 shift timing valve of FIG. 7. When the solenoid of the 2→3 shift valve is operated by a signal to change the gear of the 2→3 shift at the position X, the $C_2$ clutch oil pressure $Pc_2$ rises to the predetermined value (a piston stroke oil pressure $P_B$.) When the piston stroke of the $C_2$ clutch piston has advanced, the $C_2$ oil pressure $Pc_2$ rises is further increased. Until the $C_2$ clutch oil pressure $Pc_2$ reaches the predetermined value $P_A$ (namely in the $P_{B1}$ orifice drain time), as mentioned above, the $B_1$ oil pressure $P_{B1}$ is slowly reduced from the passage $L_4$ through the orifice 3 of the 2→3 shift timing valve. When the $C_2$ oil pressure $Pc2$ has reached the predetermined value $P_A$ (namely the value to be proportioned by the force of the spring 1 of the 2→3 shift timing valve and the oil pressure $P_{ACC}$ of the accumulator control valve being supplied from the passage L1), the spool 1 is urged to the lower position, the passage L5 is opened, and the $B_1$ oil pressure $P_{B1}$ is quickly reduced in the drain time. FIG. 9 shows the characteristic of the output shaft torque which causes the shift shock in this shifting operation. The Japanese Patent Publication No. 4940585 also shows the above mentioned structure.

In the above mentioned gear change using both multiple engaging elements, the shift shock depends on the predetermined pressure value ($P_A$ in FIG. 8) to change the shift timing value for quick drain of the engaging oil pressure of the disengaging side of the multiple element friction engaging device. The lower the shift shock the better for the automobile.

An oil circuit has a resistance to the passage of the oil flow, therefore there is a pressure difference P between the clutch oil pressure $P_B$ in the chamber of the clutch $C_2$ and the piston stroke oil pressure PB supplied to the 2→3 shift timing valve (shown in FIG. 10) and, the lower the oil temperature is, the larger the pressure difference P. The oil pressure $P_A$ at the changing point of the shift timing valve is a predetermined higher value than the piston stroke oil pressure $P_B$ of the multiple engaging element of the engaging side of the engaging device. The oil pressure $P_A$ is higher than the oil pressure $P_B$ at a low oil temperature. Namely, the viscosity of the oil decreases with the increase of the oil temperature, the resistance of the oil in the oil circuit passages reduces and the pressure difference between the oil pressure $P_A$ and the oil pressure $P_B$ at the low oil temperature and the oil pressure $P_B$ at the high oil temperature increases, therefore the shift shock in the normal driving mode becomes worse.

SUMMARY OF THE INVENTION

It is an object of the invention to provide an improved automatic transmission control device which obviates the above conventional drawbacks.

In order to accomplish the object, an automatic transmission control device is provided with a first multiple element friction engaging device, a second multiple element friction engaging device engaged for the purpose of the up-shift when the first multiple element friction engaging device is released, a shift timing valve having a return spring and a movable part so that an engaging oil pressure of the first multiple element friction engaging device is reduced quickly when the force transmitted by an engaging oil pressure of the second multiple element friction engaging device supplied to the timing valve is larger than the force transmitted by an accumulator back pressure modulated by the return spring and a throttle pressure from a throttle valve. A throttle valve operating means controls the throttle valve to modulate the throttle pressure, an oil temperature sensing means is disposed in an oil control circuit of the transmission control device, and a control means operates the throttle valve operating means so that the accumulator back pressure modulated by the throttle pressure is less than that provided when the oil temperature is under a predetermined value as compared to

DETAILED DESCRIPTION OF THE INVENTION

Figure 1:
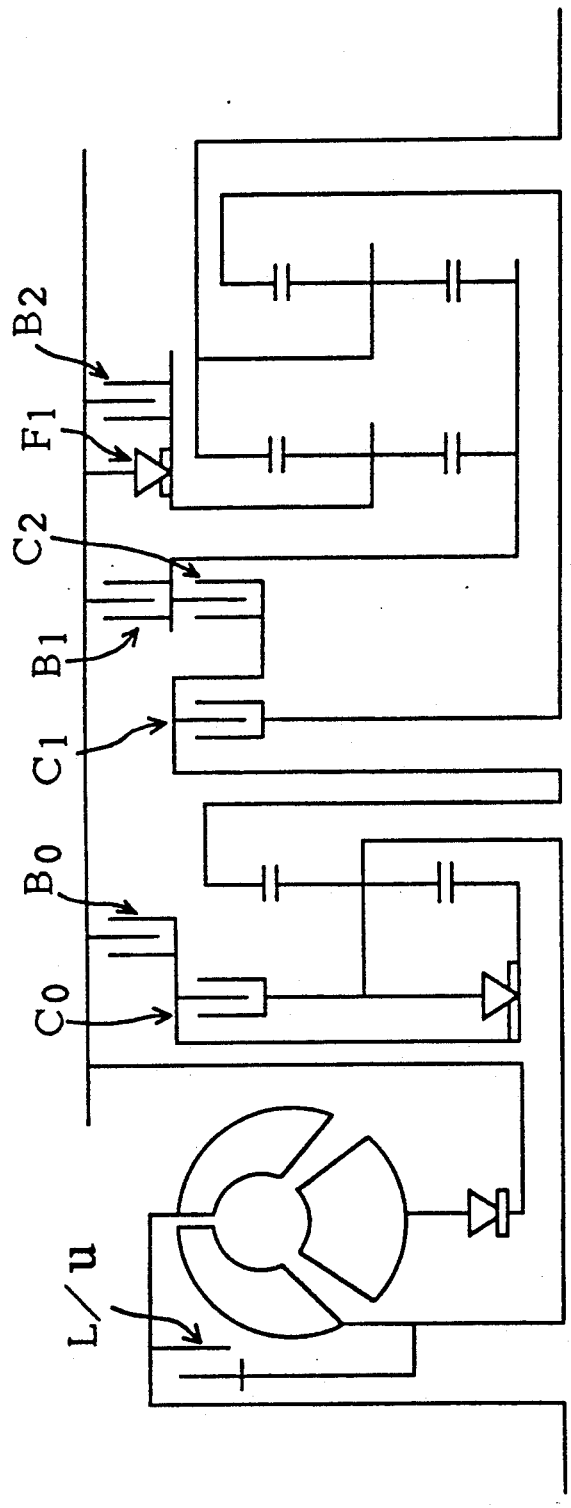
FIG. 1 shows a schematic of a gear train of an automatic transmission of the invention.
Figure 2:
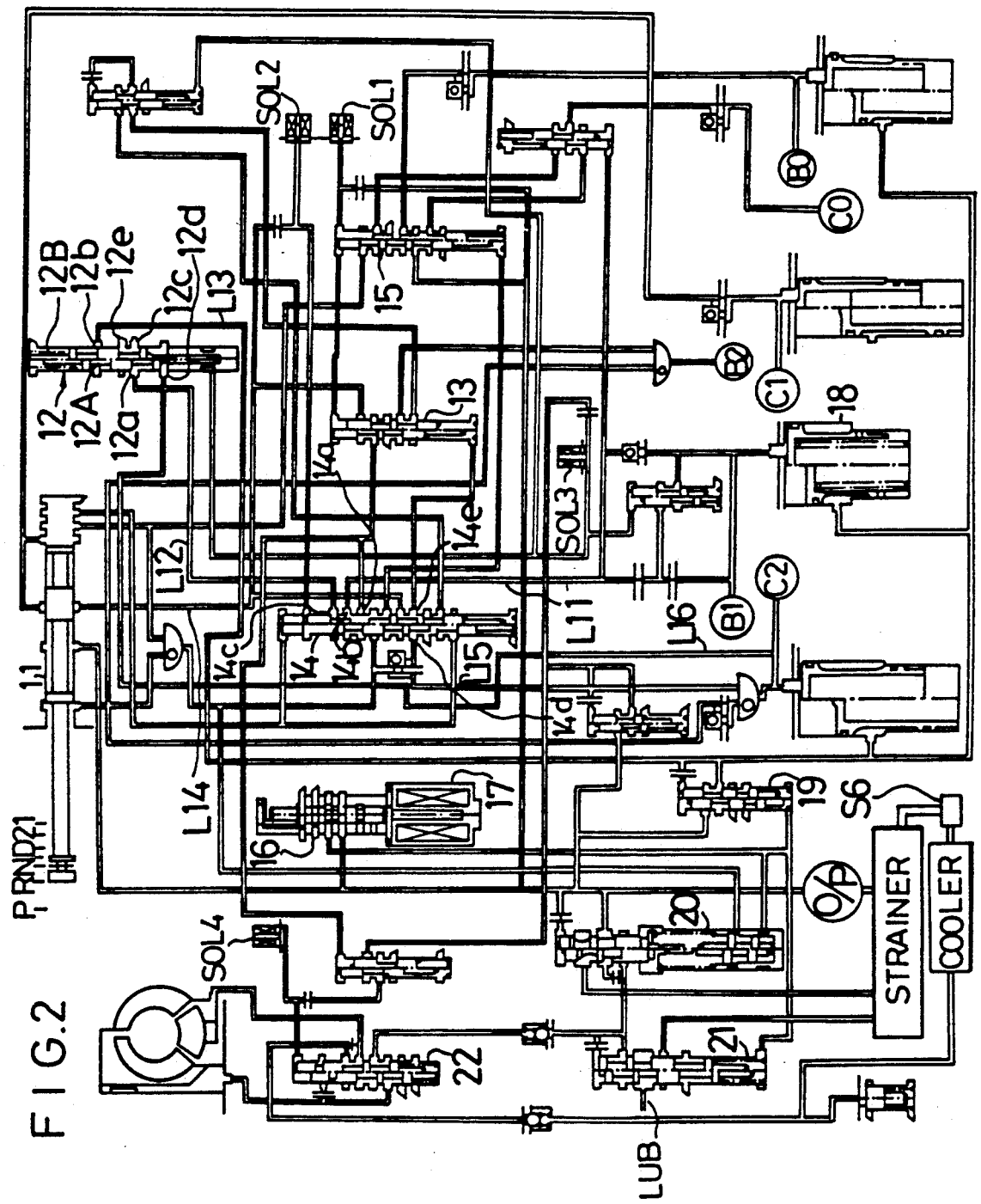
FIG. 2 shows an embodiment of an oil pressure control circuit of the invention.

With reference to FIG. 2, number 11 indicates a manual valve, 12 indicates a 2→3 shift timing valve, 13 indicates a 1→2 shift valve, 14 indicates a 2→3 shift valve, 15 indicates a 3→4 shift valve, 16 indicates a throttle valve, 17 indicates a solenoid controlling throttle oil pressure, 18 indicates a brake $B_1$ accumulator, 19 indicates an accumulator control valve, 20 indicates a primary regulator valve, 21 indicates a secondary regulator valve and, 22 indicates a lock-up control valve. Shifting is effected by a shift control of solenoid valves SOL1 and SOL2 and on-off operations of the multiple element friction engaging devices for each gear ratio are shown in the following table 1.

TABLE 1

Figure 3:
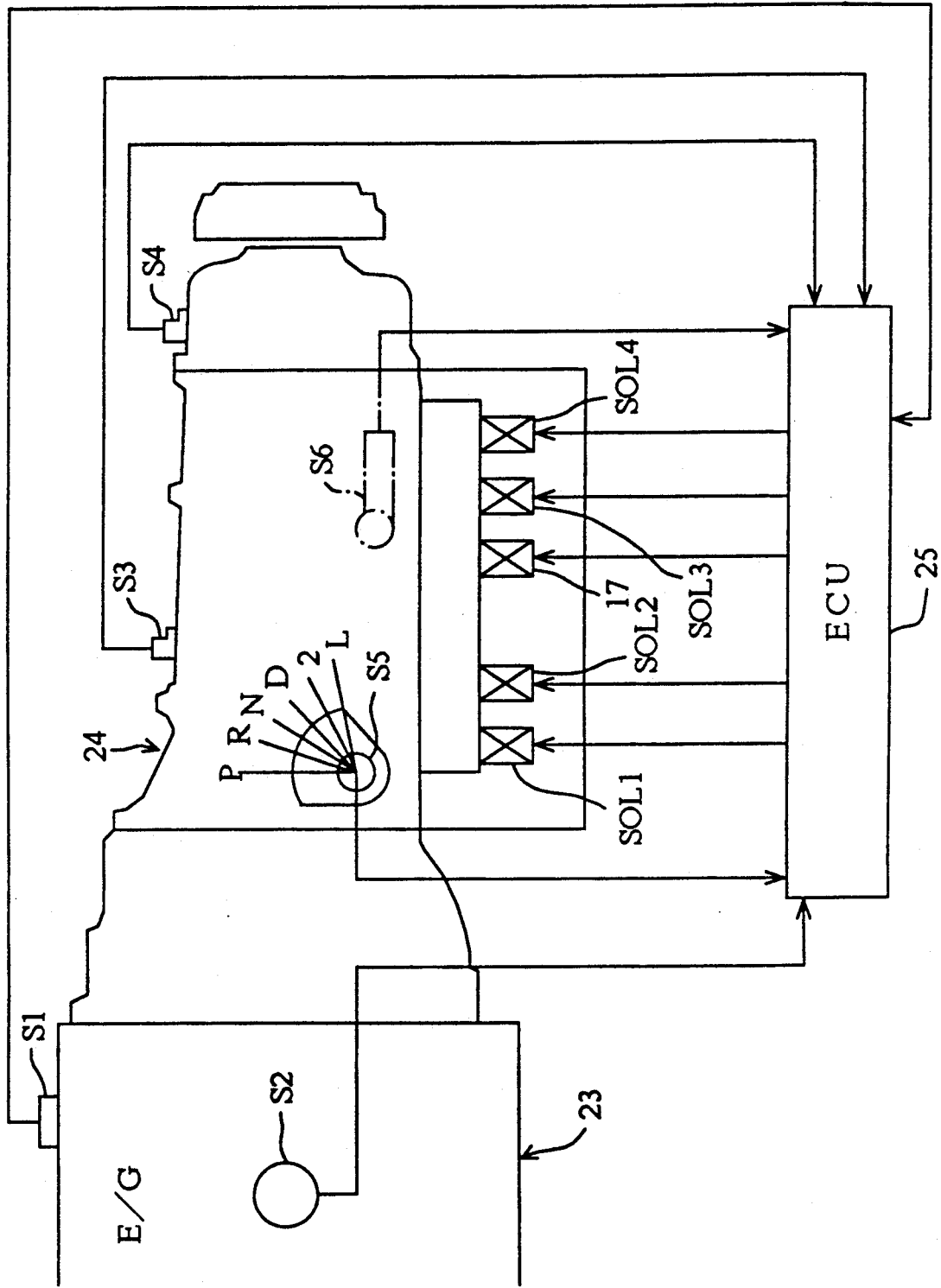
FIG. 3 shows a control system used in the embodiment of the FIG. 2.

|   |     | C0 | C1 | C2 | B0 | B1 | B2 |
|---|-----|----|----|----|----|----|----|
|   | P   | O  | X  | X  | X  | X  | X  |
|   | R   | O  | X  | O  | X  | X  | O  |
|   | N   | O  | X  | X  | X  | X  | X  |
| D | 1   | O  | O  | X  | X  | X  | X  |
|   | 2   | X  | O  | X  | X  | O  | X  |
|   | 3   | O  | O  | O  | X  | X  | X  |
|   | O/D | X  | O  | O  | O  | X  | X  |
| 2 | 1   | O  | O  | X  | X  | X  | X  |
|   | 2   | O  | O  | X  | X  | X  | O  |
|   | L   | O  | O  | X  | X  | X  | O  | wherein
SOL1: normal closed type solenoid valve
SOL2: normal opened type solenoid valve In FIG. 3 a reference number 23 indicates an engine, 24 indicates a automatic transmission, S1 indicates an engine rotational speed sensor, S2 indicates a throttle sensor, S3 indicates a $C_1$ clutch drum rotational speed sensor, S4 indicates an output shaft rotational speed sensor, S5 indicates a position sensor, and S6 indicates an oil temperature sensor disposed in a passage of the oil pressure control circuit between an oil strainer and an oil cooler. Signals from the sensors are transmitted to a microcomputer 25. A first solenoid valve SOL1, a second solenoid valve SOL2, a solenoid to control the throttle oil pressure 17, a timing solenoid valve SOL3, and a solenoid valve to control the lock-up SOL 4 are operated by signals from the microcomputer 25.

In the oil pressure control device of the automatic transmission, when the 2→3 shift valve is changed (in the right valve condition in FIG. 2) at the 2→3 shift-up, an oil pressure supplied from the 1→2 shift valve to a port 14a is cut off, and a port 14b supplying an oil pressure to $B_1$ is opened to a port 14c transmitting an oil pressure to the 2→3 shift timing valve 12. Thereby, an oil pressure ($B_1$ oil pressure) from the brake $B_1$ and the $B_1$ accumulator 18 is supplied to the port 12a of the 2→3 shift timing valve through the passage L11, the 2→3 shift valve port 14b, the port 14c and the passage L12. At this time the spool 12A of the 2→3 shift timing valve 12 is located in the lower position (in the left valve condition in FIG. 2) by means of the return spring 12B and the accumulator back pressure supplied from the accumulator control valve 19 to the port 12b through the passage L13. Therefore, the $B_1$ oil pressure supplied to the port 12a is reduced by draining the oil through the orifice 12c, and the oil pressure for actuating the brake $B_1$ slowly decreases.

The 2→3 shift valve 14 is changed by the 2→3 shift-up, the port 14d is communicated with the port 14e, and the line pressure is supplied to the clutch $C_2$ through the passages L14 and L15. At the same time the line pressure ($C_2$ oil pressure) supplied to the clutch $C_2$ is supplied to the port 12d of the 2→3 shift timing valve 12 through the passage L16, and acts in the opposite direction to the return spring 12B and the accumulator back pressure $P_{ACC}$ from the port 12c against the spool 12A. After the piston stroke of the clutch $C_2$ has been completed and the $C_2$ oil pressure supplied to the 2→3 shift timing valve 12 has reached a fixed value, the spool 12A moves up against the spring 12B and the accumulator back pressure $P_{ACC}$ (in the right valve condition in FIG. 2). Thereby the port 12a is communicated with the drain port 12e and the $B_1$ oil pressure is quickly reduced by draining the oil through the port 12j. At this time the force balance of the 2→3 shift timing valve 12 is the following:

$$S1 \times P_A \geqq F + S \times P_{ACC} \tag{1}$$

wherein
S1: a pressure area of $P_A$ ($P_{C2}$)
F: a spring force of the return spring 12B
S: a pressure are of the accumulator back pressure $P_{ACC}$.

When the oil pressure $P_A$ satisfies the formula (1), the 2→3 shift timing valve 12 is changed. Namely the oil pressure $P_A$ is determined by the accumulator back pressure $P_{ACC}$.

Figure 4:
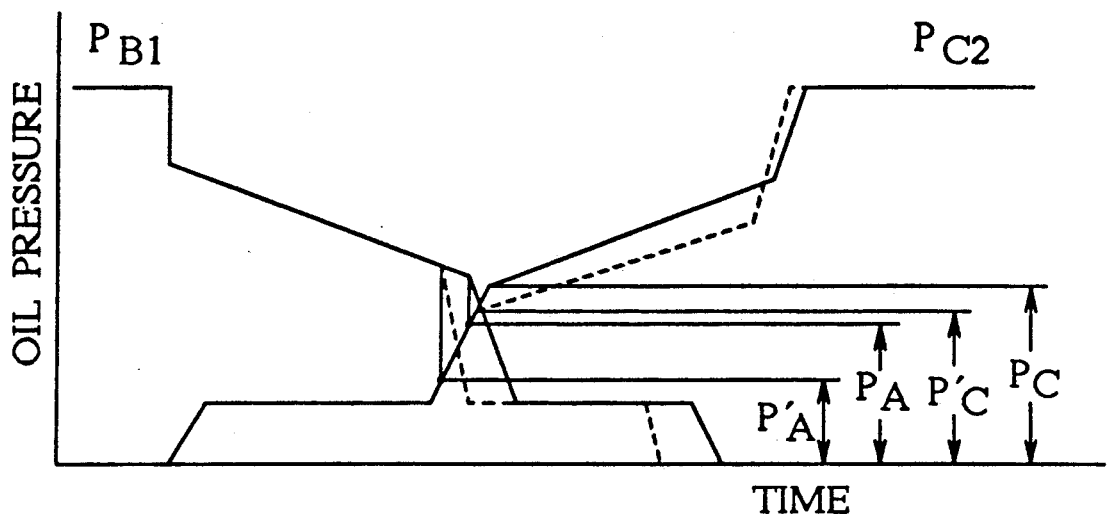
FIG. 4 shows an oil pressure characteristic of the invention.
Figure 5:
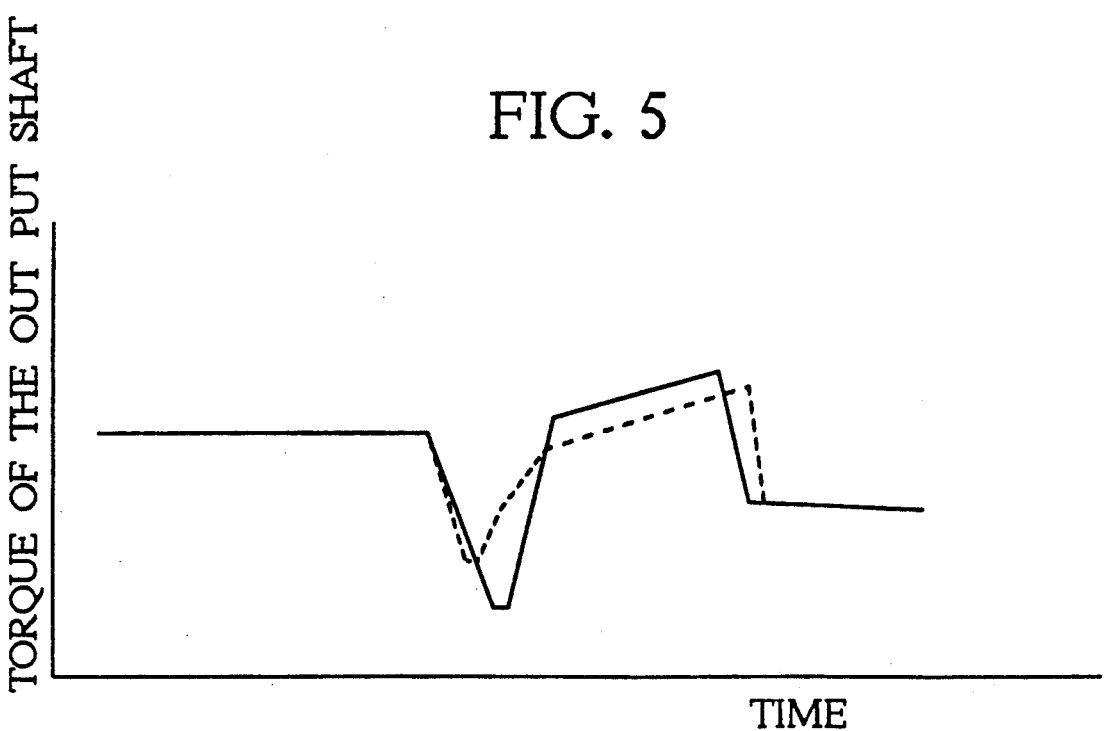
FIG. 5 shows a torque characteristic of an output shaft of the invention.
Figure 6:
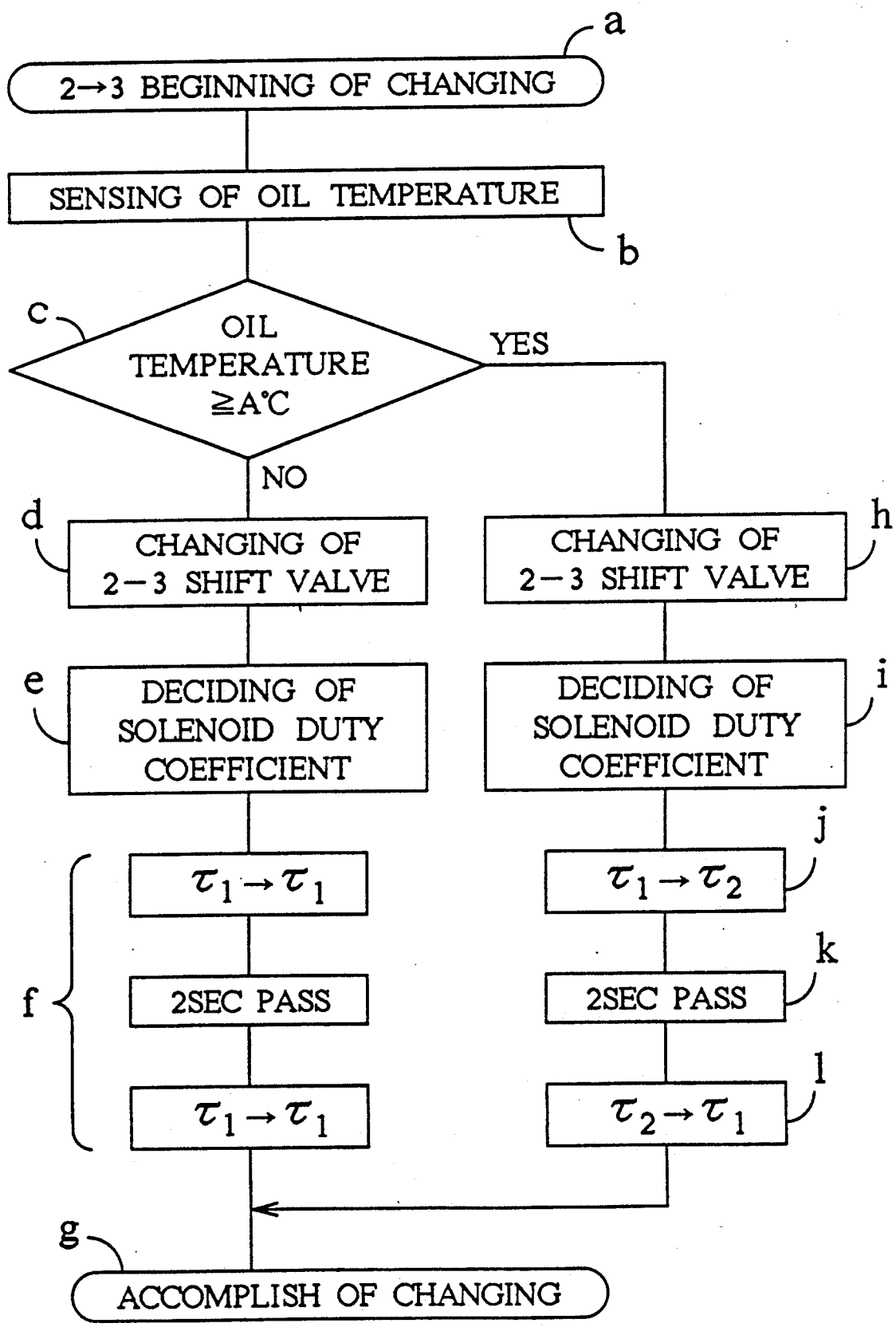
FIG. 6 is a flow chart showing control operations of the invention.
Figure 7:
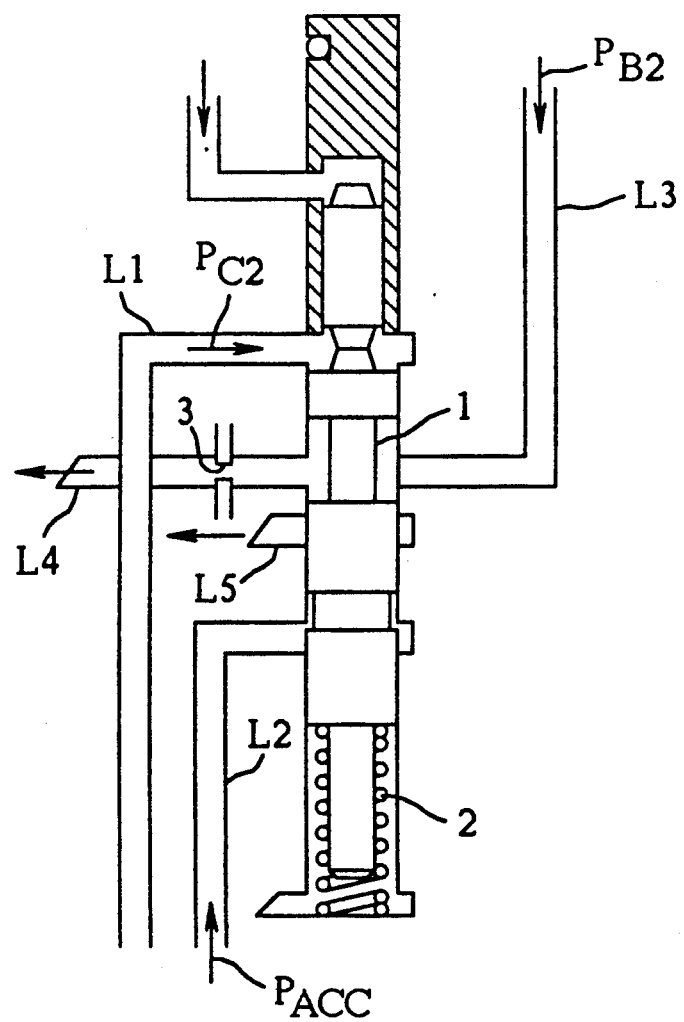
FIG. 7 shows a sectional view of a shift timing valve of the prior art.
Figure 8:
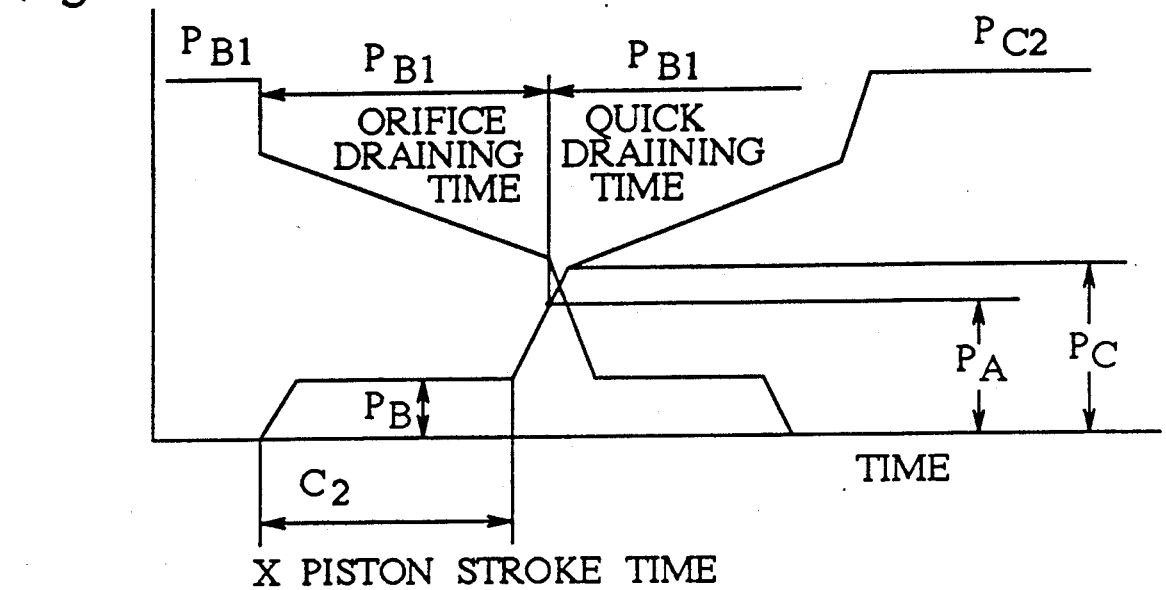
FIG. 8 shows an oil pressure characteristic of the shift timing valve according to FIG. 7.
Figure 9:
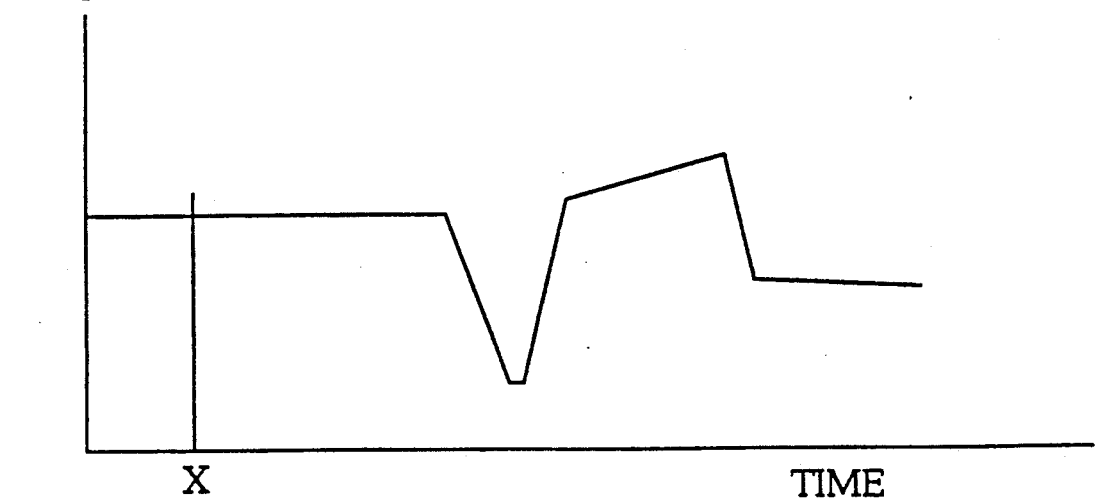
FIG. 9 shows a torque characteristic of the output shaft of the prior art.
Figure 10:
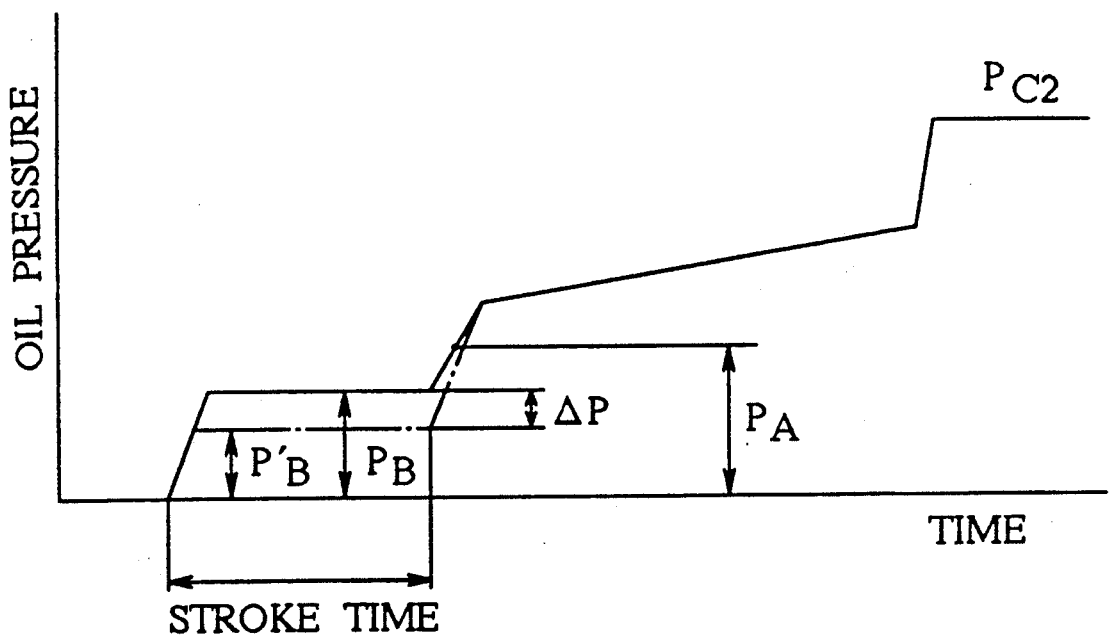
FIG. 10 shows an oil pressure characteristic between the clutch chamber of the engaging side and the shift timing valve.

FIGS. 4 and 5 show an oil pressure characteristic of the $B_1$ oil pressure ($P_{B1}$) and the $C_2$ oil pressure ($P_{C2}$) at the 2→3 shift-up and a torque characteristic of the output shaft, the full lines in FIGS. 4 and 5 are suitable for the oil pressure characteristics shown in FIGS. 8 and 9. In FIG. 6, the microcomputer 25 receives the signals form the sensors $S_1$, $S_2$, $S_4$, senses the beginning of the 2→3 shifting (a), and senses the oil temperature through the oil temperature sensor S6(b) further decides whether the oil temperature is over the predetermined value (c). If the temperature is under the value ("NO" in FIG. 6), the second solenoid valve SOL2 is changed to "OFF" and the 2→3 shift valve 14 is changed (d). The duty coefficient of the solenoid to control the throttle oil pressure is decided at (e), and the duty coefficient is maintained to a predetermined value $\tau_1$ until the end (g) of shift changing stops(f). The throttle pressure is provided by the throttle valve 16 according to the duty coefficient $\tau_1$, and the accumulator back pressure $P_{ACC}$ is provided by the accumulator control valve 19 to the 2→3 shift timing value 12 through the passage L13 according to the throttle pressure. Therefore, if the oil temperature is under the predetermined value, the changing oil pressure $P_A$ at the low temperature is decided by the formula (1) (FIG. 4). If the oil temperature is over the predetermined value ("YES" in FIG. 6), the second solenoid valve SOL2 is changed to "OFF" to change the 2→3 shift valve 14 (h), the duty coefficient of the solenoid 17 to control the throttle oil pressure is decided (i), the value $\tau_1$ is changed to $\tau_2$ (j). The throttle pressure is provided by the throttle value 16 according to the duty coefficient $\tau_2$, and the accumulator back pressure $P_{ACC}'$ ($P_{ACC} > P_{ACC}'$) is provided by the accumulator control valve 19 to the 2→3 shift timing valve 12 through the passage L13 according to the throttle pressure. Therefore, if the oil temperature is over the predetermined value, the changing oil pressure $P_A'$ ($P_A \leq P_A'$ in FIG. 4) at the high temperature is decided by the formula (1). After the duty coefficient is changed and the $B_1$ oil pressure draining time has been accomplished (k), the duty coefficient $\tau_2$ is changed to $\tau_1$ (l) and the shifting is accomplished. When the oil temperature is over the predetermined value, the oil pressure characteristics of the $C_2$ clutch oil pressure and $B_1$ brake oil pressure are shown as a dotted line in FIG. 4 and the torque characteristic of the output shaft is shown as a dotted line in FIG. 5. The change of the dotted line is smaller than one of the full line, therefore, the shift shock is reduced.

For example, the oil pressure $P_A$ at the changing point is 1.4 Kg/cm² when the oil temperature is less than 80° C. and a $P_A$ value of 1.7 Kg/cm² at temperatures over 80° C. is best for a reduction in shift shock. The invention is used not only for the 2→3 shift timing valve but also for the other shift timing valves (ex. 1→2 shift timing valve, 3→4 shift timing valve).

The principles, preferred embodiments and modes of operation of the present invention have been described in the foregoing application. The invention which is intended to be protected herein should not, however, be construed as limited to the particular forms disclosed, as these are to be regarded as illustrative rather than restrictive. Variations and changes may be made by those skilled in the art without departing from the spirit of the present invention. Accordingly, the foregoing detailed description should be considered exemplary in nature and not limited to the scope and spirit of the invention as set forth in the appended claims.

What is claimed is:

1. An automatic transmission shift control device, comprising,
   a first multiple element friction engaging device,
   a second multiple element friction engaging device engaged for an up-shift of the transmission when said first multiple element friction engaging device is released from engagement,
   a shift timing valve having a spool movable to a plurality of positions, a return spring and a port, the spool being moved so that an engaging oil pressure of said first multiple element friction engaging device is quickly reduced when a force transmitted by an engaging oil pressure of said second multiple element friction engaging device supplied to said timing valve is greater than the force transmitted by an accumulator back pressure modulated by said return spring and throttle pressure from a throttle valve,
   a throttle valve operating means controlling said throttle valve to modulate said throttle pressure,
   an oil temperature sensing means disposed in an oil control circuit of said transmission control device, and
   a control means operating said throttle valve operating means so that said accumulator back pressure modulated by said throttle pressure is less than that provided when the oil temperature is under a predetermined value as compared to when the oil temperature sensed by said oil temperature sensing means is greater than said predetermined value.

2. An automatic transmission shift control device according to claim 1,
   wherein said throttle valve operating means is a solenoid,
   said oil temperature sensing means is an oil temperature sensor, and
   said control means is a micro computer.

3. An automatic transmission shift control device according to claim 2, wherein
   said automatic transmission device has at least three gear ratios; and
   said shift timing valve being associated with the 2→3 shift.

* * * * *